United States Patent [19]
Mouri et al.

[11] Patent Number: 6,133,413
[45] Date of Patent: *Oct. 17, 2000

[54] METHOD OF MANUFACTURING DEVULCANIZED RUBBER USING HIGH TEMPERATURE AND SHEARING PRESSURE

[75] Inventors: Makoto Mouri, Seto; Arimitsu Usuki, Nagoya; Atsushi Murase, Nagoya; Norio Sato, Nagoya; Yasuyuki Suzuki, Toyota; Masao Owaki, Aichi-ken; Kazuya Watanabe, Inazawa; Hidenobu Honda, Ichinomiya; Katsumi Nakashima, Inchinomiya; Katsumasa Takeuchi, Ichinomiya; Masayoshi Ichikawa, Ichinomiya, all of Japan

[73] Assignees: Kabushiki Kaisha Toyota Chuo Kenkyusho, Aichi-gun; Toyota Jidosha Kabushiki Kaisha, Toyota; Toyoda Gosei Co., Ltd., Nishikasugai-gun, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/769,631

[22] Filed: Dec. 18, 1996

[30] Foreign Application Priority Data

Dec. 19, 1995 [JP] Japan .................................. 7-349109
Dec. 12, 1996 [JP] Japan .................................. 8-352965

[51] Int. Cl.[7] .................................................. C08C 19/08
[52] U.S. Cl. .............................................. 528/481; 523/307
[58] Field of Search ...................................... 528/502, 481

[56] References Cited

U.S. PATENT DOCUMENTS 2,461,192   2/1949   Banbury .

FOREIGN PATENT DOCUMENTS

| 0 657 263 A1 | 6/1995 | European Pat. Off. . |
| 0 744 436 A1 | 11/1996 | European Pat. Off. . |
| 52-23183 | 2/1977 | Japan . |
| 53-28474 | 8/1978 | Japan . |
| 54-22479 | 2/1979 | Japan . |
| 58-7642 | 2/1979 | Japan . |
| 871925 | 7/1961 | United Kingdom . |

*Primary Examiner*—Christopher Henderson
*Attorney, Agent, or Firm*—Oblon, Spivak, McClelland, Maier & Neustadt, P.C.

[57] ABSTRACT

Devulcanized rubber in which sulfuric crosslinking bonds are cut and which contains carbon black particles having very small diameters. Vulcanized rubber of discarded products is devulcanized by heating it at a temperature of 180° C. —350° C. and applying a shearing pressure of 10–150 kg/cm$^2$ thereto. Reclaimed rubber products are manufactured by vulcanizing and molding, into desired shapes, a material made of only devulcanized rubber in which sulfuric crosslinking bonds are cut and which contains carbon black particles having very small diameters or a material made of the devulcanized rubber mixed with virgin unvulcanized rubber.

14 Claims, No Drawings

METHOD OF MANUFACTURING DEVULCANIZED RUBBER USING HIGH TEMPERATURE AND SHEARING PRESSURE

BACKGROUND OF THE INVENTION

1. Field of the Invention

The present invention relates to devulcanized rubber manufactured to recycle a discarded vulcanized rubber, a method of manufacturing the devulcanized rubber, and a method of manufacturing reclaimed molded rubber products from the devulcanized rubber.

2. Description of the Related Arts

The conventional method is carried out as follows to recycle discarded vulcanized rubbers such as used tires, scraps generated in manufacturing molded rubber products, and discarded defective products: Initially, the vulcanized rubber is pulverized into coarse particles, and then devulcanizing treatment is performed; i.e., sulfur crosslinking bonds in the vulcanized rubber are cut to form it into devulcanized rubber. Then, the devulcanized rubber is vulcanized and molded to obtain products having a desired shape.

A devulcanizing method called PAN method is known. In this conventional method, after chemical devulcanizing agent and reclaiming oil are added to the discarded vulcanized rubber, the mixture is treated in an autoclave at 200° C. and a water vapor pressure of 14.5 kg/cm².

The devulcanized rubber according to the conventional method is, however, poor in its quality. Reclaimed rubber products manufactured by vulcanizing the devulcanized rubber again and molding it into desired shapes do not have the rubber characteristic suitable for practical use.

In order to solve this problem, as an ordinary method of manufacturing molded rubber products from the devulcanized rubber, 20–30 parts by weight of the devulcanized rubber is added to 100 parts by weight of virgin unvulcanized rubber to form devulcanized rubber material, and then the devulcanized rubber material is vulcanized and molded to obtain reclaimed rubber products having desired shapes.

The molded rubber products processed from the devulcanized rubber thus obtained has the rubber characteristic suitable for practical use. But the conventional method is incapable of recycling a great amount of discarded vulcanized rubber such as automobile tires.

Thus, in the conventional method, virgin rubber must be mixed with devulcanized rubber to obtain reclaimed rubber having rubber characteristic suitable for practical use.

SUMMARY OF THE INVENTION

The present invention has been made in view of the above-described problems. It is accordingly an object of the present invention to provide devulcanized rubber which can be used alone as a material to be processed into molded rubber products having the rubber characteristic suitable for practical use; a method of manufacturing the devulcanized rubber; and a method of manufacturing molded rubber products from the devulcanized rubber.

Devulcanized rubber of the present invention is formed of rubber with sulfur crosslinks thereof severed and carbon black particles of 100 nm or less in diameter.

The diameter of carbon black particles of the devulcanized rubber is 5 nm or more.

A method of manufacturing devulcanized rubber of the present invention includes the steps of: (a) pulverizing vulcanized rubber; (b) heating the pulverized vulcanized rubber in the temperature range of 180° C. to 350° C.; and (c) applying a shearing pressure in the pressure range of 10 to 150 kg/cm² to the pulverized vulcanized rubber, thereby preparing the devulcanized rubber comprising rubber with sulfur crosslinks thereof severed and carbon black particles of 100 nm or less in diameter.

In the method of manufacturing devulcanized rubber of the present invention, the diameter of carbon black particles is 5 nm or more.

The method of manufacturing devulcanized rubber further includes the step of adding carbon black to the vulcanized rubber.

The method of manufacturing devulcanized rubber still further includes the step of adding chemical devulcanizing agent and/or reclaiming oil to the vulcanized rubber.

In the method of manufacturing devulcanized rubber, the vulcanized rubber is EPDM (ethylene-propylene-diene terpolymer), the temperature range is from 280° C. to 330° C., and the pressure range is from 10 to 30 kg/cm².

In the method of manufacturing devulcanized rubber, the vulcanized rubber is natural rubber, the temperature range is from 200° C. to 270° C., and the pressure range is from 10 to 50 kg/cm². In the method of manufacturing devulcanized rubber, the vulcanized rubber is styrene-butadiene rubber, the temperature range is from 200° C. to 270° C., and the pressure range is from 10 to 50 kg/cm².

In the method of manufacturing devulcanized rubber, the vulcanized rubber is butyl rubber, the temperature range is from 180° C. to 250° C., and the pressure range is from 10 to 30 kg/cm².

A method of manufacturing molded rubber products of devulcanized rubber comprises the steps of: (a) vulcanizing devulcanized rubber, wherein the devulcanized rubber comprises rubber with sulfur crosslinks severed and carbon black particles of 100 nm or less in diameter; and (b) molding the vulcanized rubber obtained in the step (a) to a desired shape.

In the devulcanized rubber according to the present invention, sulfur crosslinking bonds are cut, and the diameters of carbon black particles contained therein are 100 nm or less.

Particles of carbon black having the above-described characteristic are finely dispersed in the devulcanized rubber according to the present invention. The carbon black contributes to maintaining the quality of the characteristic of reclaimed molded rubber products obtained by vulcanizing the devulcanized rubber and molding it into desired shapes.

Although the reason for the above action of the carbon black is not clear, it is supposed that particles of the carbon black having the diameter of 100 nm or less serve as an intermediary point between rubber molecules.

If the diameter of the carbon black particle is greater than 100 nm, a great number of rubber molecules concentrate on the carbon black particles. Consequently, the structure of the devulcanized rubber might become brittle.

The smaller the diameter of the carbon black particle is, the better the property of the reclaimed rubber is. But it is not preferable that the carbon black has a diameter smaller than 5 nm, because it is too small to serve as the intermediary point between rubber molecules.

Thus, the molded rubber product processed from the above-mentioned devulcanized rubber has the rubber characteristic similar to that of a molded rubber product processed from virgin unvulcanized rubber, as shown in Tables 1 and 3.

This means that the reclaimed rubber of the present invention is not necessary to be mixed with virgin rubber for manufacturing molded products having practical rubber characteristics.

DETAILED DESCRIPTION OF THE INVENTION

When the discarded vulcanized rubber is devulcanized, the sulfuric crosslinking bonds present therein are cut, but the main chains of the molecules of the vulcanized rubber remain in the devulcanized rubber. It is not necessary to cut all the sulfuric crosslinking bonds.

The above-described rubber characteristic means the elasticity of molded rubber products which can be indicated in terms of tensile strength, elongation at break and the like.

Coarse carbon black particles contained in the discarded vulcanized rubber are finely pulverized in devulcanizing treatment which will be described later.

In order to obtain the devulcanized rubber of the present invention, carbon black should be added to the discarded vulcanized rubber before devulcanizing treatment is performed, if the vulcanized rubber does not contain carbon black.

The diameter of the carbon black particle to be added to the vulcanized rubber is greater than 100 nm because primary carbon particles agglomerate with each other, but are made to be smaller by a shearing force which is applied to the vulcanized rubber in the devulcanizing treatment which will be described later.

Sulfur or a sulfur compound is mixed with raw rubber which is an aggregate of long chain organic compounds having carbon main chains to form many types of sulfur crosslinking bonds such as —S— bond, —S—S— bond, —S—S—S— bond between carbon main chains of the raw rubber. In this manner, the vulcanized rubber having the property of elastomer or that of rubber is processed.

The chain organic compounds include natural rubber, butadiene rubber, isoprene rubber, butyl rubber, ethylene-propylene rubber, styrene-butadiene rubber, chloroprene rubber, nitrile rubber, acrylic rubber, epichlorohydrin rubber, chlorosulfonated polyethylene, chlorinated polyethylene and EPDM (ethylene-propylene-diene terpolymer).

Sulfur or a sulfur compound is mixed with natural rubber containing carbon chains to form many types of sulfur crosslinking bonds between the carbon chains of the natural rubber. In this manner, the vulcanized rubber having the property of elastomer or that of rubber is also processed.

In order to manufacture the devulcanized rubber of the present invention, the discarded vulcanized rubber is devulcanized at 180° C.–350° C. by applying a shearing pressure of 10–150 $kg/cm^2$.

In the devulcanizing treatment to be performed in the above-described condition, the sulfur crosslinking bonds in the vulcanized rubber are cut, but the main chains of rubber molecules are not cut.

The devulcanizing treatment allows carbon black particles contained in the discarded vulcanized rubber to be pulverized to 100 nm or less in diameter, thus preventing the rubber characteristic of the molded rubber product processed from the devulcanized rubber from being deteriorated.

If the vulcanized rubber is heated at a temperature lower than 180° C. in the devulcanizing treatment, it takes long to cut the sulfuric crosslinking bonds. That is, it takes long to complete the devulcanizing treatment.

On the other hand, if the vulcanized rubber is heated at a temperature higher than 350° C. in the devulcanizing treatment, there is a high possibility that the main chains in rubber molecules are cut, which leads to a high degree of deterioration in the rubber characteristic of the molded rubber product processed from the devulcanized rubber.

If the shearing pressure of less than 10 $kg/cm^2$ is applied to the vulcanized rubber in the devulcanizing treatment, there is a high possibility that the carbon black particles are unfavorably prevented from becoming fine and being dispersed in the devulcanized rubber. The molded rubber product processed from the devulcanized rubber manufactured in this condition is not suitable for practical use. In this condition, the desirable molded rubber product cannot be processed from the reclaimed devulcanized rubber unless the vulcanized rubber is mixed with a large amount of virgin unvulcanized rubber. That is, when the devulcanizing treatment is carried out in this condition, the discarded vulcanized rubber cannot be recycled in a large quantity. Further, it takes long to cut sulfur crosslinking bonds. That is, it takes long to complete the devulcanizing treatment.

On the other hand, if the shearing pressure higher than 150 $kg/cm^2$ is applied to the vulcanized rubber in the devulcanizing treatment, the main chains in rubber molecules can be undesirably cut. Consequently, the molded rubber product processed from the devulcanized rubber could have a greatly deteriorated quality.

According to the present invention, an apparatus capable of applying a shearing force to the discarded vulcanized rubber and heating it is used.

As the apparatus, a twin screw extruder or a rubber roller can be used.

The vulcanizing treatment is performed for one to five minutes.

Preferably, chemical devulcanizing agent is added to the discarded vulcanized rubber in the devulcanizing treatment.

The chemical devulcanizing agent cuts sulfuric crosslinking bonds in the vulcanized rubber. The addition of the chemical devulcanizing agent to the vulcanized rubber allows the devulcanizing treatment to be accomplished at a temperature lower by about 20° C. than the normal devulcanizing temperature, thus preventing the main chains of the rubber molecules from being cut.

The chemical devulcanizing agent is selected from at least one of diallyl disulfide, dixylyl disulfide, thiophenol, and iron oxide, etc.

Preferably, reclaiming oil is added to the vulcanized rubber of the discarded products in the devulcanizing treatment.

The reclaiming oil is compatible with the vulcanized rubber. As a result of the addition of the reclaiming oil to the vulcanized rubber, the vulcanized rubber swells. Consequently, the cutting of the sulfur crosslinking bonds in the vulcanized rubber can be accelerated.

The use of the reclaiming oil allows the devulcanizing treatment to be completed in a short period of time, thus preventing the cutting of the main chains of the rubber molecules.

The reclaiming oil can be selected from at least one of paraffinic process oils and naphthenic process oils, etc.

Various kinds of additives which are used in the conventional devulcanizing treatment may be utilized in the devulcanizing treatments of the present invention. The additives include carbon black, zinc oxide, stearic acid, and the like.

The discarded vulcanized rubber, if it is EPDM, is preferably devulcanized at 280–330° C. by applying a shearing pressure of 10–30 $kg/cm^2$ thereto.

The effective network chain density of the devulcanized rubber thus obtained by the devulcanizing treatment of the present invention is approximately 10–25% compared to the rubber before devulcanizing. This means that the network structure remains in this devulcanized rubber.

The reclaimed rubber product by the present invention has a complex and dense network structure in contrast to a rubber product produced by vulcanizing and molding virgin unvulcanized rubber. Thus, the reclaimed rubber product of the present invention has higher quality than the usual rubber product has.

The present invention discloses above the method for producing a devulcanized rubber suitable for a raw material of a reclaimed rubber product having excellent characteristics even though it is used as a single ingredient. "EPDM" of the present invention is ethylene-propylene-diene terpolymer whose hydrocarbon main chain is a copolymer of ethylene, propylene and diene. The double bonds involved in the vulcanization are not located in the hydrocarbon main chain but in side chains. The diene is 5-ethylidene-2-norbornene dicyclopentadiene or the like.

EPDM is produced by mixing a raw rubber having above carbon main chains and sulfur or sulfuric compounds. It has —s—, —s—s—, —s—s—s— bond or the like as sulfur bridges between the carbon main chains to exhibit properties of elastomer or rubber.

The "network structure" means a three-dimensional network structure where —s—, —s—s—, —s—s—s— or the like bridges between rubber molecules.

If the vulcanized rubber is heated at a temperature lower than 280° C. in the devulcanizing treatment, the obtained reclaimed rubber is a little less devulcanized and could lose some elasticity such as elongation. If the vulcanized rubber is heated at a temperature higher than 330° C., the network concentration may be less than 10%. The reclaimed rubber product produced under this condition may be equivalent in its property to the rubber product produced by vulcanizing and molding usual virgin unvulcanized rubber.

If the shearing pressure of less than 10 kg/cm$^2$ is applied to the vulcanized rubber in devulcanizing, the carbon black particles may be unfavorably prevented from becoming fine and being dispersed in the devulcanized rubber. The molded rubber product produced from the devulcanized rubber manufactured in this condition is not suitable for practical use. In this condition, further, the preferable molded rubber product cannot be produced from the reclaimed rubber without mixing it with a large amount of virgin unvulcanized rubber. That is, when the devulcanizing treatment is carried out in this condition, the discarded vulcanized rubber cannot be recycled sufficiently. Further, it elongates the completion of the devulcanizing treatment because it takes long to cut sulfur crosslinking bonds.

On the other hand, if the shearing pressure higher than 30 kg/cm$^2$ is applied to the vulcanized rubber in the devulcanizing treatment, the network concentration may be 10% or less compared to the rubber before devulcanizing. The reclaimed rubber product produced in this condition may be almost equivalent in its property to the rubber product obtained by vulcanizing and molding usual virgin unvulcanized rubber.

According to a method of manufacturing molded rubber products of reclaimed rubber comprises the steps (a) or (b); (a) preparing a material of devulcanized rubber in which sulfur crosslinking bonds are cut and which contains carbon black particles having diameters 100 nm or less, or (b) preparing a material of a mixture of devulcanized rubber and virgin unvulcanized rubber; and vulcanizing and molding the material of the devulcanized rubber into desired shapes.

The above-described manufacturing method is an example to utilize the devulcanized rubber of the present invention.

The rubber product obtained by molding only the devulcanized rubber of the present invention has the similar rubber characteristic as that of a molded rubber product processed from virgin unvulcanized rubber alone.

The molded rubber product obtained by mixing the devulcanized rubber of the present invention and virgin unvulcanized rubber with each other at a desired ratio has also the similar rubber characteristic as that of the molded rubber product processed from the virgin unvulcanized rubber alone.

The above-described method is capable of recycling a large amount of discarded vulcanized rubber products such as automobile tires.

Various vulcanizing agents consisting of sulfur and peroxide can be used in the vulcanizing treatment. The method of vulcanizing and molding the devulcanized rubber can be carried out similarly to that of vulcanizing and molding virgin unvulcanized rubber.

EXAMPLES

Description will be made below on the devulcanized, namely, reclaimed rubber according to the embodiments of the present invention; the method of manufacturing the devulcanized rubber according to the embodiments; and the method of manufacturing molded rubber products from the reclaimed rubber according to the embodiments.

In the devulcanized rubber according to the present invention, sulfur crosslinking bonds are cut, and the diameters of carbon black particles contained therein are 100 nm or less.

The method of manufacturing the devulcanized, namely, reclaimed rubber will be described below.

Initially, discarded vulcanized rubber is pulverized. The pulverized rubber is introduced into a twin screw extruder in which the diameter of a screw was 30 mm and its length was 1260 mm, and a shearing pressure is applied thereto while it is being heated to devulcanize it. Then, the devulcanized rubber is cooled. In this manner, the devulcanized rubber in the form of strand is obtained.

In the method of manufacturing a molded rubber product from the devulcanized rubber, initially, the following substances are added to 100 parts by weight of devulcanized rubber: 0.5 parts by weight of sulfur; 1.7 parts by weight of zinc oxide; 0.3 parts by weight of stearic acid; 0.67 parts by weight of NOCCELER TT; and 0.17 parts by weight of NOCCELER M.

NOCCELER TT : Tetramethylthiuramdisulfide;
NOCCELER M: 2-Mercaptobenzothiazole

These are trademarks of OUCHISHINKO CHEMICAL INDUSTRIAL CO., LTD.

The substances are mixed with each other to form a material to be molded into a reclaimed rubber product.

Thereafter, the material is molded by a press machine to obtain the molded reclaimed rubber product.

Description will be made below on specimens 1–7 made of devulcanized rubber of the present invention and comparison specimens C1 and C2 also made of devulcanized rubber were prepared. With reference to Tables 1–3, description will be also made below on the rubber characteristic of molded rubber products processed from the specimens 1–7 and from the comparison specimens C1 and C2.

Discarded rubber products made of EPDM was devulcanized to form the specimens 1–3 and 7, and the comparison specimen C1, whereas rubber of discarded products made of butyl rubber was devulcanized to form the specimens 4–6 and the comparison specimen C2.

As described above, the devulcanized rubber of the specimen 1 was prepared as follows: The vulcanized rubber of the discarded products was pulverized. The pulverized rubber was introduced into a twin screw extruder in which the diameter of a screw was 30 mm and its length was 1260 mm. Then, a shearing pressure was applied thereto while it was being heated to devulcanize it. The throughput capacity of the extruder was 5 kg per hour.

The specimens 2 and 3 were prepared as in the case of the specimen 1 except that the specimen 2 was made of one part by weight of chemical devulcanizing agent (diallyl disulfide) mixed with 100 parts by weight of the vulcanized rubber of the discarded products in devulcanizing the specimen 2; and that the specimen 3 was made of 10 parts by weight of reclaiming oil (process oil) mixed with 100 parts by weight of the vulcanized rubber of the discarded products in devulcanizing the specimen 3.

The devulcanized rubber of the specimens 4, 5, and 6 was prepared in the same condition as that of the specimens 1, 2, and 3, respectively. As described above, the material of the specimens 4–6 was vulcanized butyl rubber.

The specimen 7 was prepared in the same condition as that of the specimen 1 except that the shearing pressure in the devulcanizing treatment was 20 kg/cm$^2$.

The shearing pressure, the temperature, and the period of time in the devulcanizing treatment are indicated in Table 1.

The devulcanized rubber of the comparison specimens C1 and C2 were prepared in the same method as that of the specimen 1. As described above, the material of the comparison specimen C2 was vulcanized butyl rubber.

The shearing pressure, the temperature, and the period of time in the devulcanizing treatment for comparison specimens C1 and C2 are indicated in Table 2.

Mooney viscosities of the specimens 1–7 and the comparison specimens C1 and C2 were measured. The results are shown in Tables 1 and 2. The average diameters of carbon black particles of the specimens 1–7 and the comparison specimens C1 and C2 were measured with an electron microscope. The results are also shown in Tables 1 and 2.

The additives described previously were added to the specimens 1–7 and the comparison specimens C1 and C2 to form them into materials of reclaimed rubber. Then, the materials were introduced into a pressing machine to form sheets, the dimension of each of which was 5 mm in thickness, and 30 cm by 30 cm. Dumbbell specimens were used to measure the tensile strength and the elongation at break of each of the specimens 1–6 and the comparison specimens C1 and C2 in accordance with JIS-K6301 (experimental condition).

Tables 3 shows the tensile strength and the elongation at break of molded rubber products prepared by vulcanizing and molding two materials of virgin unvulcanized rubber one containing EPDM, and another containing butyl rubber. The two materials were vulcanized and molded in the same manner to that of the specimens 1–7 and the comparison specimens C1 and C2 to obtain reclaimed molded rubber products denoted by reference numerals 1 and 2.

The results of the measurements are described below with reference to Tables 1 to 3.

The Mooney viscosities of the devulcanized rubber of the specimens 1–7 were low, which indicates that sulfur crosslinking bonds of the vulcanized rubber were cut sufficiently by the devulcanizing treatment performed in the condition shown in Table 1. The diameters of particles of the carbon black contained in the devulcanized rubber of the specimens 1–7 were mainly 40–60nm.

It was also found that the vulcanized rubber of the specimens 2 and 5 were devulcanized at a temperature lower than that at which the vulcanized rubber of the specimens 1 and 4 were devulcanized. It was also found that the vulcanized rubber of the specimens 3 and 6 were devulcanized in a period of time shorter than that in which the vulcanized rubber of the specimens 1 and 4 were devulcanized. These results indicate that the addition of either the chemical devulcanizing agent or the reclaiming oil to the vulcanized rubber of discarded products before devulcanizing allowed the vulcanized rubber to be devulcanized with a higher efficiency.

The tensile strength and the elongation at break of the products by vulcanizing and molding the devulcanized rubber of the specimens 1–3 were almost equal to those of the product denoted by the reference specimen 1 shown in Table 3. That is, Table 3 indicates that the molded reclaimed rubber products processed from the devulcanized rubber of the specimens 1–3 have the same rubber characteristic as that of the rubber product obtained by vulcanizing and molding the virgin unvulcanized rubber.

The tensile strength and the elongation at break of the sheets processed by vulcanizing and molding the devulcanized rubber of the specimens 4–6 were also almost equal to those of the product denoted by the reference specimen 2 shown in Table 3. That is, Table 3 indicates that the molded reclaimed rubber products processed from the devulcanized rubber of the specimen 4–6 have the same rubber characteristic as that of the molded rubber product obtained by vulcanizing and molding the virgin unvulcanized rubber.

The reclaimed rubber product of specimen 7 was equivalent in the elongation at break to the other specimens. However, the tensile strength was greater than the other specimens and reference numeral 1 of Table 3.

The reclaimed rubber product form the devulcanized rubber was superior to the rubber product from the virgin unvulcanized rubber.

The Mooney viscosities of the devulcanized rubber of the comparison specimens C1 and C2 were high, which indicates that sulfur crosslinking bonds of the vulcanized rubber were not cut sufficiently by the devulcanizing treatment performed in the condition shown in Table 2. The diameters of particles of the carbon black contained in the devulcanized rubber of the comparison specimens C1 and C2 were mainly 190–200 nm.

Further, the tensile strength and the elongation at break of the products processed by vulcanizing and molding the devulcanized rubber of the comparison specimens C1 and C2 were lower than those of the products denoted by the reference specimens 1 and 2 shown in Table 3. That is, Table 3 indicates that the molded rubber products processed from the devulcanized rubber of the comparison specimens C1 and C2 do not have the rubber characteristic suitable for practical use.

TABLE 1

| SPECIMEN No. | 1 | 2 | 3 | 4 | 5 | 6 | 7 |
| --- | --- | --- | --- | --- | --- | --- | --- |
| DISCARDED VULCANIZED RUBBER | EPDM | EPDM | EPDM | BUTYL RUBBER | BUTYL RUBBER | BUTYL RUBBER | EPDM |
| CHEMICAL DEVULCANIZING AGENT | NOT ADDED | 1 PART BY WEIGHT | NOT ADDED | NOT ADDED | 1 PART BY WEIGHT | NOT ADDED | NOT ADDED |

TABLE 1-continued

| SPECIMEN No. | 1 | 2 | 3 | 4 | 5 | 6 | 7 |
|---|---|---|---|---|---|---|---|
| RECLAIMING OIL | NOT ADDED | NOT ADDED | 10 PARTS BY WEIGHT | NOT ADDED | NOT ADDED | 10 PARTS BY WEIGHT | NOT ADDED |
| SHEARING PRESSURE (kg/cm$^2$) | 50 | 50 | 50 | 50 | 50 | 50 | 20 |
| TEMPERATURE (° C.) | 300 | 270 | 300 | 200 | 190 | 200 | 300 |
| PERIOD OF TIME (MINUTE) | 4 | 4 | 2 | 4 | 4 | 2 | 4 |
| THROUGHPUT CAPACITY (kg/hour) | 5 | 5 | 5 | 5 | 5 | 5 | 5 |
| MOONEY VISCOSITY (ML1 + 4, 100° C.) | 60 | 50 | 45 | 60 | 50 | 50 | 70 |
| AVERAGE DIAMETER OF CARBON BLACK PARTICLE (nm) | 50 | 60 | 60 | 40 | 50 | 60 | 50 |
| TENSILE STRENGTH (kg/cm$^2$) | 200 | 180 | 170 | 150 | 130 | 130 | 300 |
| ELONGATION AT BREAK (%) | 650 | 680 | 700 | 600 | 650 | 680 | 700 |

TABLE 2

| SPECIMEN No. | C 1 | C 2 |
|---|---|---|
| DISCARDED VULCANIZED RUBBER | EPDM | BUTYL RUBBER |
| CHEMICAL DEVULCANIZING AGENT | NOT ADDED | NOT ADDED |
| RECLAIMING OIL | NOT ADDED | NOT ADDED |
| SHEARING PRESSURE (kg/cm$^2$) | 5 | 5 |
| TEMPERATURE (° C.) | 200 | 250 |
| PERIOD OF TIME (MINUTE) | 4 | 4 |
| THROUGHPUT CAPACITY (kg/hour) | 5 | 5 |
| MOONEY VISCOSITY (ML1 + 4, 100° C.) | 120 | 140 |
| AVERAGE DIAMETER OF CARBON BLACK PARTICLE (nm) | 200 | 190 |
| TENSILE STRENGTH (kg/cm$^2$) | 80 | 60 |
| ELONGATION AT BREAK (%) | 200 | 150 |

TABLE 3

| SPECIMEN No. | REFERENCE SPECIMENT 1 | REFERENCE SPECIMENT 2 |
|---|---|---|
| VIRGIN UNVULCANIZED RUBBER | EPDM | BUTYL RUBBER |
| TENSILE STRENGTH (kg/cm$^2$) | 200 | 160 |
| ELONGATION AT BREAK (%) | 670 | 610 |

What is claimed is:

1. A method of manufacturing devulcanized rubber comprising rubber with sulfur crosslinks thereof severed and carbon black particles of 100 nm or less in diameter comprising the steps of:
   (a) pulverizing vulcanized rubber selected from the group consisting of EPDM (ethylene-propylene-diene terpolymer) rubber, natural rubber, styrene-butadiene rubber and butyl rubber containing carbon black;
   (b) heating the pulverized vulcanized rubber containing carbon black in the temperature range of 280° C. to 330° C. when the rubber is EPDM rubber, 200° C. to 270° C. when the rubber is natural rubber, 200° C. to 270° C. when the rubber is styrene-butadiene rubber, or 180° C. to 250° C. when the rubber is butyl rubber;
   (c) applying a shearing pressure in the pressure range of 10 to 30 kg/cm$^2$ when the rubber is EPDM rubber, 10 to 50 kg/cm$^2$ when the rubber is natural rubber, 10 to 50 kg/cm$^2$ when the rubber is styrene-butadiene rubber, or 10 to 30 kg/cm$^2$ when the rubber is butyl rubber, while heating the pulverized vulcanized rubber containing carbon black, whereby sulfur crosslinking bonds in the vulcanized rubber are cut while main chains of the rubber are not cut, thereby preparing said devulcanized rubber.

2. A method of manufacturing devulcanized rubber according to claim 1, wherein the diameter of carbon black particles is 5 nm or more.

3. A method of manufacturing devulcanized rubber according to claim 1, further comprising, before step (a), adding carbon black to the vulcanized rubber.

4. A method of manufacturing devulcanized rubber according to claim 1, further comprising the step of adding chemical devulcanizing agent and/or reclaiming oil to the vulcanized rubber.

5. A method of manufacturing devulcanized rubber according to claim 1, wherein the vulcanized rubber is EPDM (ethylene-propylene-diene terpolymer).

6. A method of manufacturing devulcanized rubber according to claim 2, wherein the vulcanized rubber is EPDM (ethylene-propylene-diene terpolymer).

7. A method of manufacturing devulcanized rubber according to claim 3, wherein the vulcanized rubber is EPDM (ethylene-propylene-diene terpolymer).

8. A method of manufacturing devulcanized rubber according to claim 4, wherein the vulcanized rubber is EPDM (ethylene-propylene-diene terpolymer).

9. A method of manufacturing devulcanized rubber according to claim 1, wherein the vulcanized rubber is natural rubber.

10. A method of manufacturing devulcanized rubber according to claim 2, wherein the vulcanized rubber is natural rubber.

11. A method of manufacturing devulcanized rubber according to claim 1 wherein the vulcanized rubber is styrene-butadiene rubber.

12. A method of manufacturing devulcanized rubber according to claim 2, wherein the vulcanized rubber is styrene-butadiene rubber.

13. A method of manufacturing devulcanized rubber according to claim 1, wherein the vulcanized rubber is butyl rubber.

14. A method of manufacturing devulcanized rubber according to claim 2, wherein the vulcanized rubber is butyl rubber.

* * * * *